United States Patent [19]

Audet

[11] Patent Number: 4,807,506
[45] Date of Patent: Feb. 28, 1989

[54] PORTABLE SAW TABLE

[76] Inventor: Michel P. Audet, 109, Ruisseau de Frênes, Ste-Agnès, Quebec, Canada, G0T 1R0

[21] Appl. No.: 190,123

[22] Filed: May 4, 1988

[51] Int. Cl.⁴ ............................................. B27B 5/20
[52] U.S. Cl. .................... 83/486.1; 83/477.1; 83/471.3; 83/574; 83/581; 144/286 R
[58] Field of Search .................. 409/182; 144/136 D, 144/136 C, 286 R, 286 A; 83/471.1, 471.2, 471.3, 477.1, 477.2, 473, 529, 574, 581

[56] References Cited

U.S. PATENT DOCUMENTS

| | | | |
|---|---|---|---|
| 3,130,758 | 4/1964 | McKinly | 83/486.1 |
| 3,195,591 | 7/1965 | Haberman | 83/477.2 |
| 3,645,306 | 2/1972 | Adams, Sr. | 83/477.2 |
| 3,896,692 | 7/1975 | Stubbs | 83/486.1 |
| 4,516,453 | 5/1985 | Parcham, Jr. | 83/574 |
| 4,630,656 | 12/1986 | Collins | 409/182 |

*Primary Examiner*—W. Donald Bray
*Attorney, Agent, or Firm*—Roland L. Morneau

[57] ABSTRACT

A saw table having an undercarriage mounted under the table pivotable about an axis adjacent one of its lateral sides and angularly actuated by a handle extending on the side of the table opposite the axle. The undercarriage has a frame extending outside the one side of the table and above the latter. A carriage, adapted to support the circular saw is slidingly mounted on the frame to move above and across the table.

9 Claims, 4 Drawing Sheets

PORTABLE SAW TABLE

BACKGROUND OF THE INVENTION

1. Field of the Invention

The present invention relates to an elongated saw table supporting an undercarriage rotatably mounted about a vertical axis perpendicular to the surface of said table. A saw supporting carriage is supported by a frame of the undercarriage which extends outside and above the table. The carriage slides above and across the table. The movement of the carriage relative to the table is provided by the rotation of the undercarriage which is transversally fixed, relative to the table. The translation movement of the carriage across the table is obtained by a sliding mechanism relative to the undercarriage.

2. Prior Art

Known saw table usually have a complex structure to provide the desired rotation and translation movements to the saw. In U.S. Pat. No. 3,730,042, the bedplate needs to be stiffened by channels and bars. The extensible table needs also to be supported by angle bars. The channels are equipped with a plurality of pairs of idlers providing support for the angle bars which form rails across the full length of the bed plate. In U.S. Pat. No. 3,955,456, at least one upper deck is telescopically mounted in the main deck through a complex combination of flanges. The boom is pivotally mounted on a boom support or post and maintained in its correct position with ribs and flanges. The saw is mounted on rails laterally fixed on the boom which is pivotally supported by the post extending through the main deck.

SUMMARY OF THE INVENTION

The saw table according to the invention comprises a work table under which is pivotally mounted, an undercarriage abouyt a vertical axis. The undercarriage is provided with a frame structure which projects outside the contour of the table and upwardly above the surface of the table. A saw supporting carriage is slidingly mounted on the frame structure to move above and across the table along a horizontal plane in an angularly adjustable position. A handle is connected to the undercarriage to pivot the carriage over the table. The handle projects outside the contour of the table on the side opposite the frame structure. The carriage includes a plate having a perforation for allowing the saw blade to extend through the surface of the plate and to cut a board on the table.

In preferred embodiments, the frame structure is provided with idling wheels rotatably engaging rails on the sides the carriage. The undercarriage is held to the table by an axle located about the axis of rotation of the undercarriage and by a bracket through which a bar of the undercarriage is adapted to slide.

The side of the table opposite the frame structure has the shape of a protractor around which, the handle can lockingly slide. The axle is located adjacent one side of the table opposite the handle and at about the center of curvature of the protractor.

In order to provide an abutment for a board to be cut at an angle on the table, an arm is preferably mounted on the table and adapted to rotate about a vertical axis located in a plane perpendicular to the table and passing through the pivoting axis of the undercarriage.

DETAILED DESCRIPTION OF THE INVENTION

Figure 1:
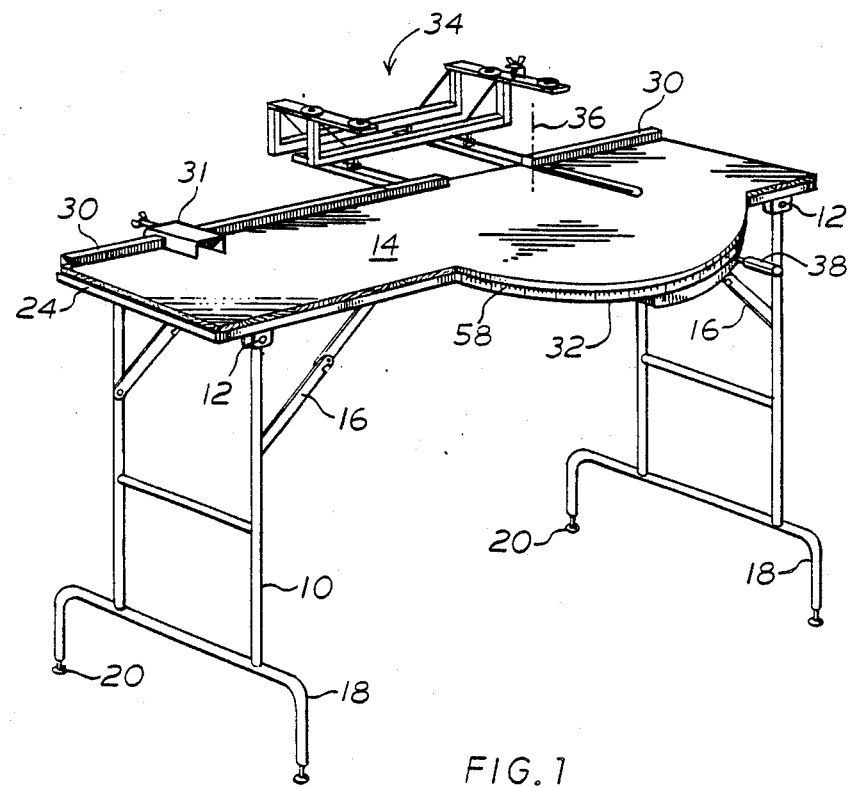
FIG. 1 is a perspective view of the foldable table according to the invention with the frame structure extending outside the surface of the table.

The saw table illustrated in FIG. 1 is of the portable type and accordingly has foldable legs 10 which are actuated about the pivot axes 12 and adapted to fold and overlap under the surface of the table 14. The legs are maintained in then erect position by blocking links 16. The legs 10 preferably have an inversed U-shape base 18, wider than the table, each supported by adjusting screws 20 for levelling the table.

Figure 2:
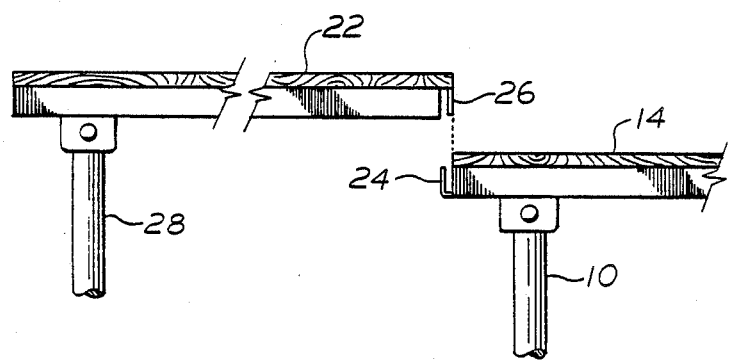
FIG. 2 is a side view of one end of the table illustrating an extension adapted to lengthen the table.

As shown in FIG. 2, an extension table 22 is foreseen when the surface of the table 14 is too short to support a long piece of board to be cut. A hook member 24 is provided at the end of table 14 which engages into a corresponding hook 26 provided at the end of the extension table 22 which is also supported by a leg 28 of the type described above. The surface of the table 14 is flat and provided with a guiding wall 30 along one longitudinal side. The wall 30 carries a scale and is used to abut a piece of board lying on the surface 14 and to guide it when the board is moved longitudinally relative to the length of the table along the wall 30. A stopper 31 which adjustably grips the wall 30 is foreseen for abutting the board at the desired distance from the saw.

The front longitudinal side of the table 14 is provided with a protractor 32 which exceeds outside the lateral side and extends in the plane of the surface 14. The surface of the table 14 covers the area inscribed in the protractor 32.

A frame structure 34 which will be explained later extends on the side of the table opposite the protractor and is pivoted about an axis 36 by a handle 38. The frame structure 34 is connected to the handle by an undercarriage 38 illustrated in FIGS. 3 and 4.

Figure 3:
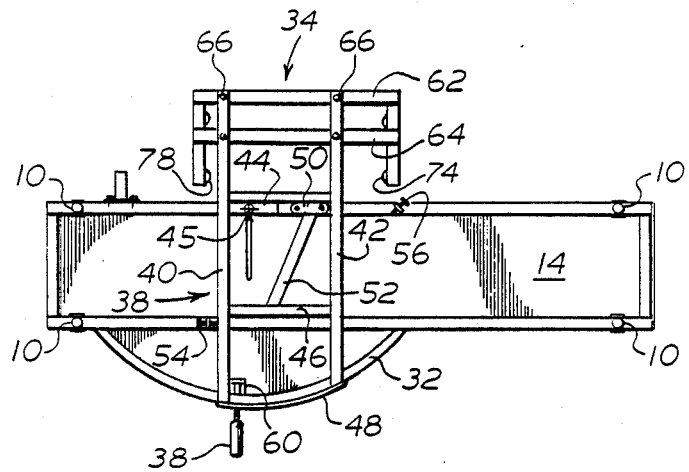
FIG. 3 is a plan bottom view of the table illustrating the undercarriage perpendicularly oriented relative to the table.
Figure 4:
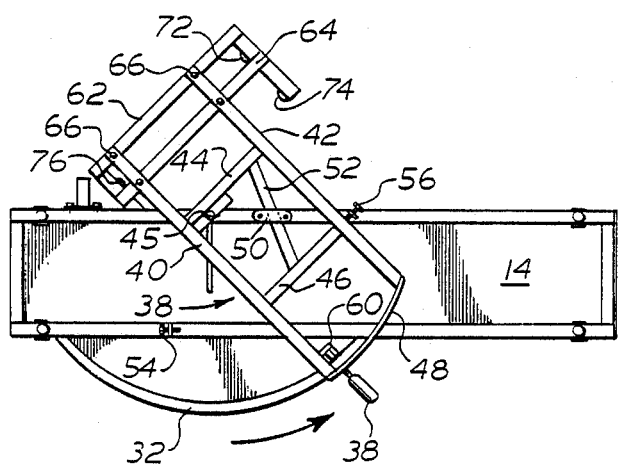
FIG. 4 is a view similar to FIG. 3 with the undercarriage oriented at 45° relative to the table.
Figure 5:
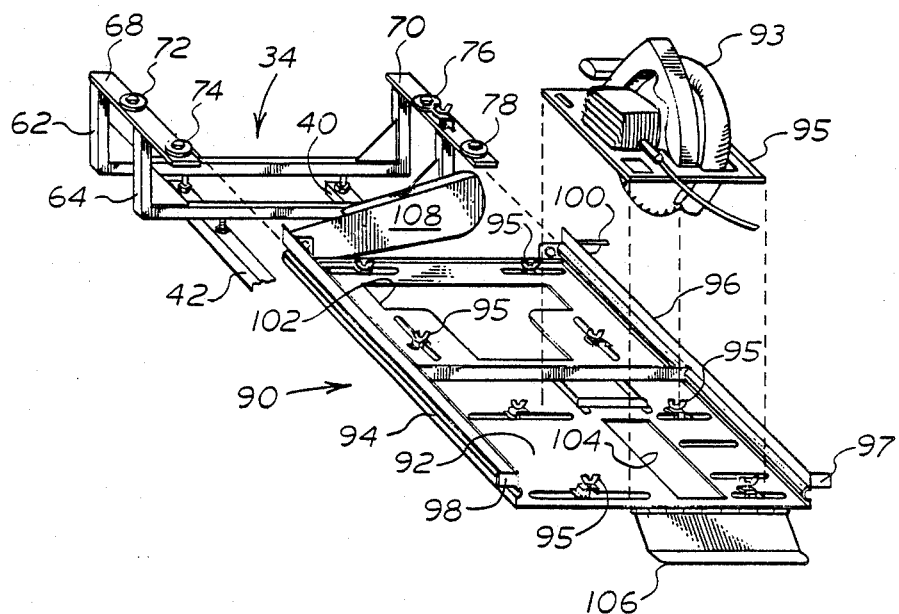
FIG. 5 is an exploded perspective view of the frame structure and the carriage adapted to slide in the frame structure, and the circular saw adapted to be fixed to the carriage.
Figure 7:
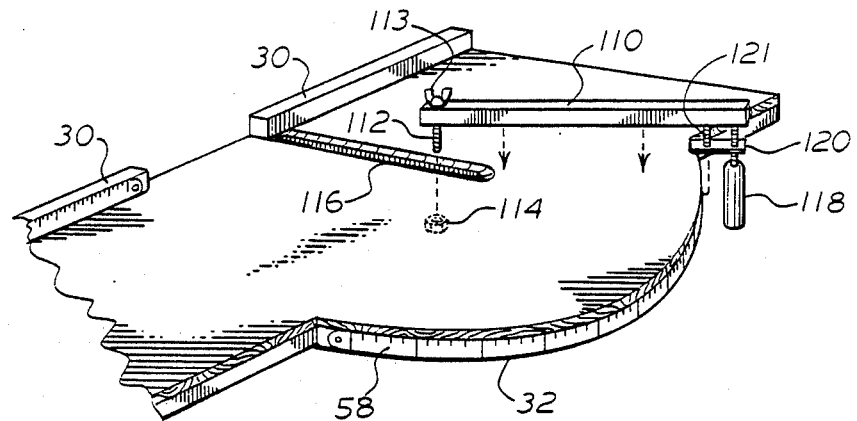
FIG. 7 is an exploded perspective view of part of the table with the protractor and the abutting arm.
Figure 6:
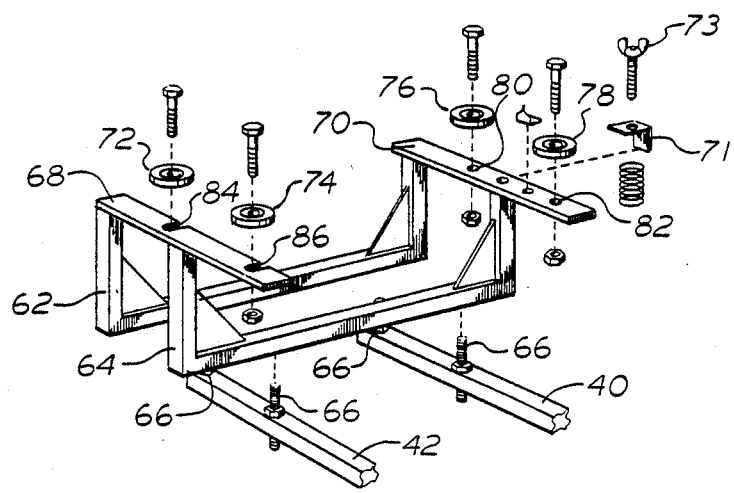
FIG. 6 is an exploded view of the frame structure.

The undercarriage 38 is made of a pair of a longitudinal bars 40 and 42 and a pair of transversal bars 44 and 46. The undercarriage 38 extends outside the surface of the table 14 to support the frame structure 34. A connecting bar 48 is secured at the end of the two longitudinal bars 40 and 42 and holds the handle 38 which is used to pivot the undercarriage 38 around the axle 45. The undercarriage 38 and the frame structure 34 are supported under the table 14 by an axle 45 and a bracket 50 in which slides the radial bar 52. The bracket 50 is made sufficiently long to allow the lateral sliding of the radial bar 52. The radial bar may also be shaped as a part of circumference whose center is the axle 45. The undercarriage 38 moves from a position illustrated in FIG. 3 to a position illustrated in FIG. 4, that is, by an angle of approximately 45°. The undercarriage 38 is prevented from moving in a clockwise direction (as seen in FIG. 3) by a stopper 54 and in a counterclockwise direction (as seen in FIG. 4) by a stopper 56. The stoppers 54 and 56 are secured to the table and abut on the longitudinal bars 40 and 42 respectively. A scale 58 is mounted on the lateral side of the protractor 32 to indicate the angle of rotation of the undercarriage 38. The handle 38 which pivotally moves the undercarriage 38 is threadedly engaged through the connecting bar 48 and the protractor 32 so that the nut 60 can tighten the protractor 32 and the connecting bar 43 by twisting the handle 38. This action prevents the pivoting of the undercarriage around the axle 45.

The frame structure 34 is mounted on the longitudinal bars 40 and 42 as illustrated in FIGS. 3, 4, 5 and 6. A pair of U-shaped rods 62 and 64 are adjustably fixed on the longitudinal bars 40 and 42 by means of bolts 66. These adjustable bolts 66 are intended to level the frame structure 34 over the longitudinal bars 40 and 42. Plates 68 and 70 are secured to the top of the U-shaped rods 62 and 64 and are intended to support idle wheels 72, 74, 76 and 78. The wheels 76 and 78 are mounted through holes 80 and 82 by bolts and nuts so as to allow the wheels to rotate freely. The wheels 72 and 74 are fixed on plate 68 through grooves 84 and 86 by means of a combination of bolts and nuts which can adjustably slide in the grooves 84 and 86. The lateral adjustment of the wheels 72 and 74 is intended to correspond to the width of the carriage 90 illustrated in FIG. 5. The wheels are located at the corners of a rectangle and are adapted to engage rails on the side of the carriage 90 to allow the later to slide and be maintained in a horizontal plane. A locking bracket 71 (shown in FIG. 6) is also mounted on plate 71 to releasably secure the carriage 90 in a fixed position in its sliding movement. The bracket 71 is held to the plate 70 by a wing nut 73 and the spring 75 is intended to release the pressure of the bracket 71 on the carriage 90 when the wing nut 73 is unscrewed.

The carriage 90 is intended to releasably support a circular saw 93. The carriage 90 is made of a plate 92 having guiding rails 94 and 96 on each side of the plate 92. The rails 94 and 96 are provided with a longitudinal groove adapted to fit and slide tightly between the wheels 74–78. At one end of the rails, stoppers 97 and 98 extend laterally to prevent the carriage 90 to slide pass the wheels of the frame structure 34. Another stopper [00 of the pivoting type is located at the other end of the carriage 90 for the same purpose. The stopper 100 is pivoted upwardly to provide access of the rails 94 and 96 to the wheels 72–78 but is lowered to serve as a stopper when the wheels are located in the rails. The plate 92 is provided with a pair of large and generally rectangular apertures 102 and 104 which are intended to receive the blade of the circular saw 93. Apertures 102 and 104 are disposed at 90° one relative to the other so that the blade of the circular saw may be oriented accordingly. On each side of the apertures 102 and 104, wing nuts are provided to releasably hold the circular saw. Each wing nut is mounted in a slot so as to be made laterally adjustable according to the width of the circular saw used. At each end of the carriage 90 a gard blade is provided depending on the protection required. The gard blade 06 is a hinged plate which extends between the carriage 90 and the table and protects the operator from saw dust expelled by the circular saw fixed over the aperture 104. At the other end, an other gard blade 108 is pivotally mounted along the lateral slide of the carriage 90 and serves as a protection for the operator when the circular saw is fixed over the aperture 102. It is pointed out that the carriage 90 is oriented in a position opposite the one shown in FIG. 5 when the power saw 93 is mounted over the aperture 102.

When an elongated rectangular piece of board is laid on the surface of the table 14, abutted against the wall 30 and longitudinally adjusted as desired, the circular saw mounted on the carriage 90 with its blade through the aperture 104 will be able to cut the board transversally by sliding the carriage in the frame structure 34. If the board needs to be cut at an angle relative to the longitudinal axis, the handle 38 can be adjusted by rotating the undercarriage 38. If one wants to cut the board along the longitudinal axis, that is, corresponding to the length of the table, the circular saw is mounted over the aperture 102. For such a purpose, the aperture 102 is located over the surface of the table 14 which means that the carriage needs to be supported by its end corresponding to the lateral sides facing the aperture 104. When the circular saw is mounted over the aperture 102 and the blade is adjusted over the board at the right distance from the guiding wall 30, the locking bracket 71 (FIG. 6) is tightened to maintain the power saw 93 stationary and the board is pushed sideways along the guiding wall 30.

Considering that most circular saws can be tiltingly adjusted on their base 95, it is accordingly possible to provide a cut through the board at an angle relative to the plane of the table 14.

The table is also provided with an abutting arm 110 which is intended to abut a board having an obtuse leading edge. The abutting arm 110 is rotatably mounted around an axle constituted by a bolt 112 connected through the table to a nut 114. The bolt 112 has preferably a wing head. The table has a transversal slot 116 adapted to retain the nut 114 and allowing the bolt 112 and the nut 114 to slide therein for allowing the abutting arm 110 to rotate about the axle 112 which can slide into the slot 116. Such an arm will provide an abutment to various types of leading edge of the board to be cut. The translation movement of the abutting arm 110 in the slot 116 can be stopped by tightening the wing bolt 113 and its rotation can be prevented by twisting the handle 118 which tightens the protractor 32 between the arm 110 and a plate 120. The plate 120 and pin 121 are adapted to slide longitudinally relative to the abutting arm 110, the latter being provided by a channel for receiving the pin 121. The sliding movement of the handle 118 and the plate 120 is needed when the center of the contour of the protractor 32 does not correspond with the axle 112. The handle 118 threadedly engages plate 120 and the end of the abutting arm 110 and accordingly than squeeze the protractor 32 and secure the arm 110 to the table 14. The longitudinal axis of the slot 116 is in line with the axle 45 and the angle which is determined by the movement of the abutting arm 110 complements the angle delimited by the handle 38. The abutting arm 110 is particularly useful when a board needs to be cut at an angle at both ends. In such a case, the first operation is to cut the board, at one end, at an angle, by adjusting the handle 38. In a second operation, the previously cut end is abutted on the abutting arm 110 and the other end of the board is cut by adjusting the handle 38 and accordingly the carriage rotation. As may be realized from the above description, the construction of the present saw table is relatively simple while it provides all the possibilities expected by a carpenter making use of a saw table. Furthermore, the table is relatively light and portable and can be folded for transportation in the trunk of a car. The table is also adapted to be used with any kind of circular saw and can be used to cut boards having various dimensions along any desired angle. The easy manipulation of the present saw table accelerate the performance of the operator.

I claim:

1. A saw table comprising a table member having two elongated lateral sides, an undercarriage pivotally mounted under said table member about a vertical axis perpendicular to said table member, the said undercarriage having a frame structure extending outside one of said lateral sides of the table member and above the level of the table member, a handle connected to said undercarriage for pivoting said undercarriage and said frame structure about said axis, the said handle extending on said side of the table opposite said frame structure, a carriage slidingly mounted on said frame structure adapted to move above and across said table member along a horizontal plane, and in an angularly adjustable position with said frame, the said carriage adapted to releasably retain a circular saw, a guiding wall secured on the table along said one lateral side for abutting and guiding a board resting on said table, whereby the circular saw mounted on said carriage is adapted to cut a board resting on said table member across and at an angle with the latter and also adapted to cut a board which slides on said table member in the direction of said guiding wall.

2. A table member as recited in claim 1, the said frame structure comprising four idle wheels, each wheel being rotatably mounted on a vertical axis, the said carriage comprising rails slidingly engaging said wheels for slidingly maintaining said carriage on said horizontal plane.

3. A table member as recited in claim 1, wherein said table member has a protractor frame extending on the side of the table member corresponding to the handle, the said protractor frame being substantially centered about said vertical axis, whereby the rotation of the carriage is determined by the location of the handle on said protractor.

4. A table member as recited in claim 3, comprising means for releasably locking the handle on said protractor frame.

5. A table member as recited in claim 1, comprising a bracket fixed to the table member under the latter, the said undercarriage comprises a radial bar slidingly mounted in said bracket, the said undercarriage being supported by said bracket and by an axle connected between said table member and said undercarriage at a location corresponding to said axis.

6. A table member as recited in claim 1, comprising a stopper releasably fixed on said guiding wall for abutting against one end of said board.

7. A table member as recited in claim 3, comprising an abutting arm pivotally mounted over the table member and extending between an axle vertically passing through the table member and releasable locking means slidingly mounted on said arm for gripping the said one side of the table member along the protractor frame, the said axle being located on a line perpendicular to said one side of the table and passing through said axis, the said abutting arm adapted to come in contact with a transversal side of a board forming a corner having an obtuse angle.

8. A table member as recited in claim 7, wherein the table member has a transversal slot for allowing said axle to be releasably fixed thereto, said slot being located along said perpendicular line.

9. A table member as recited in claim 1, comprising foldable legs hingely mounted under said table member and adapted to overlap adjacent said undercarriage.

* * * * *